US009217513B2

(12) United States Patent
Meyer et al.

(10) Patent No.: US 9,217,513 B2
(45) Date of Patent: *Dec. 22, 2015

(54) FAUCET WITH LOCKING SAFETY HANDLE

(71) Applicant: THE MEYER COMPANY, Cleveland, OH (US)

(72) Inventors: Michael H. Meyer, Sagamore Hills, OH (US); Michael A. Kolar, North Royalton, OH (US); Jeffrey J. Labinski, Lakewood, OH (US)

(73) Assignee: The Meyer Company, Cleveland, OH (US)

( * ) Notice: Subject to any disclaimer, the term of this patent is extended or adjusted under 35 U.S.C. 154(b) by 119 days.

This patent is subject to a terminal disclaimer.

(21) Appl. No.: 13/862,917

(22) Filed: Apr. 15, 2013

(65) Prior Publication Data

US 2013/0233410 A1    Sep. 12, 2013

Related U.S. Application Data

(63) Continuation of application No. 12/724,116, filed on Mar. 15, 2010, now Pat. No. 8,418,992.

(60) Provisional application No. 61/160,663, filed on Mar. 16, 2009.

(51) Int. Cl.
*F16K 35/02* (2006.01)
*F16K 35/00* (2006.01)
*F16K 41/10* (2006.01)

(52) U.S. Cl.
CPC .............. *F16K 35/00* (2013.01); *F16K 35/025* (2013.01); *F16K 41/103* (2013.01); *Y10T 137/6851* (2015.04); *Y10T 137/7043* (2015.04)

(58) Field of Classification Search
CPC ..... F16K 35/025; F16K 35/00; F16K 41/103; F16K 35/02; F16K 35/022; F16K 31/52404; F16K 31/524; F16K 31/60

USPC ............ 251/101–106, 262–263, 335.1, 335.3
See application file for complete search history.

(56) References Cited

U.S. PATENT DOCUMENTS

| | | | | |
|---|---|---|---|---|
| 759,341 A | * | 5/1904 | Brown | ............................ 251/96 |
| 1,314,195 A | * | 8/1919 | Kuehl | ........................... 251/110 |

(Continued)

FOREIGN PATENT DOCUMENTS

| | | |
|---|---|---|
| CN | 2746228 Y | 10/2004 |
| WO | WO 02/38995 | 5/2002 |

(Continued)

OTHER PUBLICATIONS

International Search Report mailed May 12, 2010 for International application No. PCT/US2010/027325.

(Continued)

*Primary Examiner* — John K Fristoe, Jr.
*Assistant Examiner* — David Colon Morales
(74) *Attorney, Agent, or Firm* — Fay Sharpe LLP (57) ABSTRACT

A faucet handle includes a safety lock. The safety lock includes a latch that is manually movable between an engaged position and a disengaged position. The latch is adapted to engage an associated catch when the latch is in its engaged position. The safety lock also includes a primary lock element that moves between a locked position and an unlocked position. The primary lock element prevents movement of the latch from its engaged position to its disengaged position when the primary lock element is in its locked position. The primary lock element allows movement of the latch from its engaged position to its disengaged position when the primary lock element is in its unlocked position. A faucet including the handle requires three steps to dispense liquid: (i) movement of the primary lock to its unlocked position; (ii) movement of the latch to its disengaged position; and (iii) movement of the handle to its liquid dispensing position.

18 Claims, 7 Drawing Sheets

(56) References Cited

U.S. PATENT DOCUMENTS

| | | | |
|---|---|---|---|
| 1,318,120 A * | 10/1919 | Wheaton | 251/109 |
| 1,669,305 A * | 5/1928 | Patierno | 251/110 |
| 1,740,945 A * | 12/1929 | Kuehn et al. | 251/105 |
| 1,743,685 A * | 1/1930 | Platt et al. | 251/109 |
| 1,758,727 A * | 5/1930 | Wildin | 251/104 |
| 1,797,282 A * | 3/1931 | Bentley | 251/104 |
| 3,104,089 A | 9/1963 | Seltsam | |
| 3,246,872 A | 4/1966 | Seltsam | |
| 3,301,525 A | 1/1967 | Chernak et al. | |
| 3,680,830 A | 8/1972 | Low et al. | |
| 4,044,998 A | 8/1977 | Giese | |
| 4,203,572 A | 5/1980 | Coffman | |
| 5,449,144 A | 9/1995 | Kowalics | |
| 5,470,044 A | 11/1995 | Chi | |
| D378,400 S | 3/1997 | Kowalics | |
| 5,671,904 A | 9/1997 | Minutillo | |
| 5,762,317 A | 6/1998 | Frahm et al. | |
| 5,836,352 A * | 11/1998 | Nimberger | 137/614.19 |
| 6,082,598 A | 7/2000 | Lee | |
| 6,086,045 A | 7/2000 | Moon | |
| 6,148,851 A * | 11/2000 | Friedline et al. | 137/385 |
| 6,793,195 B2 * | 9/2004 | Dou | 251/96 |
| 6,802,341 B1 | 10/2004 | Johnson et al. | |
| 6,868,994 B2 | 3/2005 | Kawolics | |
| 6,880,797 B2 | 4/2005 | Yui | |
| D506,529 S | 6/2005 | Roethel | |
| D508,109 S | 8/2005 | Roethel | |
| 6,962,319 B2 | 11/2005 | Zheng | |
| 7,100,888 B1 | 9/2006 | Johnson | |
| 8,418,992 B2 * | 4/2013 | Meyer et al. | 251/102 |
| 2003/0001124 A1 | 1/2003 | Chen | |
| 2003/0218147 A1 | 11/2003 | Zhen | |
| 2004/0183041 A1 | 9/2004 | Zheng | |
| 2008/0169440 A1 | 7/2008 | Meyer et al. | |
| 2009/0057339 A1 | 3/2009 | Piscotty et al. | |

FOREIGN PATENT DOCUMENTS

| | | |
|---|---|---|
| WO | WO 2005/080844 | 9/2005 |
| WO | WO 2009/054573 | 4/2009 |

OTHER PUBLICATIONS

Written Opinion mailed May 12, 2010 for International application No. PCT/US2010/027325.

Tomlinson No-Drip Division Brochure, 2004, Rev, Dec. 2008, cover and pp. 1-18.

International Preliminary Report on Patentability issued Sep. 20, 2011 for International application No. PCT/US2010/027325.

* cited by examiner

FAUCET WITH LOCKING SAFETY HANDLE

CROSS-REFERENCE TO RELATED APPLICATION

This application is a continuation of U.S. application Ser. No. 12/724,116 filed Mar. 15, 2010, now assigned U.S. Pat. No. 8,418,992, which claims priority from and benefit of the filing date of U.S. provisional patent application Ser. No. 61/160,663 filed Mar. 16, 2009, and the entire disclosure of each of said prior applications is hereby expressly incorporated by reference into the present specification.

BACKGROUND

Faucets with locking safety handles are known. These faucets are installed when it is deemed desirable to reduce the risk of accidental or inadvertent dispensing of liquid such as hot water. In general, faucets with locking safety handles require the user to manipulate a safety mechanism on the handle before the handle is operative to dispense liquid from the faucet. It has been deemed desirable to provide a new safety handle and faucet including same, wherein the safety handle provides for an intuitive and easily operated safety lock, while also providing an effective safety mechanism for reducing risk of accidental dispensing of liquid from the faucet.

SUMMARY

In accordance with a first aspect of the present development, a liquid dispensing faucet includes a body comprising an inlet, an outlet, a liquid flow passage that extends from the inlet to the outlet. A valve chamber is in communication with the liquid flow passage between the inlet and the outlet, and a valve seat is located in the valve chamber. An access opening provides access to the valve chamber from outside the body. A bonnet is secured to the body in covering relation with the access opening, and the bonnet includes a catch. A valve element is located in the valve chamber. The valve element is adapted to be selectively engaged with and disengaged from the valve seat for controlling flow of liquid from the inlet to the outlet through the valve chamber. A valve stem extends through the bonnet. The valve stem includes an inner end secured to the valve element and an outer end located external to the body. A handle includes a base and an upper portion connected to the base. The base of the handle is pivotally secured to the outer end of the valve stem and the handle is pivotable in a first direction from a first position to a second position. The valve element is engaged with the valve seat and blocks liquid flow from the inlet to the outlet when the handle is located in its first position, and the valve element is disengaged from the valve seat and allows liquid flow from the inlet to the outlet when the handle is located in its second position. The handle further includes a safety lock that selectively prevents movement of the handle from its first position to its second position. The safety lock includes a latch that moves between a latched position and an unlatched position. The latch is adapted to engage the catch of the bonnet and prevent movement of the handle from its first position to its second position when the latch is in its latched position. The latch is disengaged from the catch of the bonnet when the latch is in its unlatched position. The faucet further includes a latch spring that biases the latch toward its latched position. The latch is manually movable from its latched position to its unlatched position.

In accordance with another aspect of the present development, a faucet includes a body including an inlet and an outlet. A valve element is located in the body and controls flow of liquid from the inlet to the outlet. A bonnet is connected to the body and captures the valve element in the body. A catch is connected to the body. A valve stem includes an inner end connected to the valve element and an outer end located external to the body. A handle is connected to the outer end of the valve stem and is movable in a first direction from a first position, where the handle and valve stem locate the valve element to block the flow of liquid from the inlet to the outlet, to a second position, where the handle and valve stem locate the valve element to allow the flow of liquid from the inlet to the outlet. A safety lock is provided as part of the handle. The safety lock includes a latch that is manually movable between an engaged position and a disengaged position. The safety lock prevents movement of the handle from the first position to the second position when the latch is in its engaged position and engaged with the catch.

In accordance with another aspect of the present development, a faucet handle includes a safety lock. The safety lock includes a latch that is manually movable between an engaged position and a disengaged position. The latch is adapted to engage an associated catch when the latch is in its engaged position. The safety lock also includes a primary lock element that moves between a locked position and an unlocked position. The primary lock element prevents movement of the latch from its engaged position to its disengaged position when the primary lock element is in its locked position. The primary lock element allows movement of the latch from its engaged position to its disengaged position when the primary lock element is in its unlocked position.

DETAILED DESCRIPTION

Figure 1:
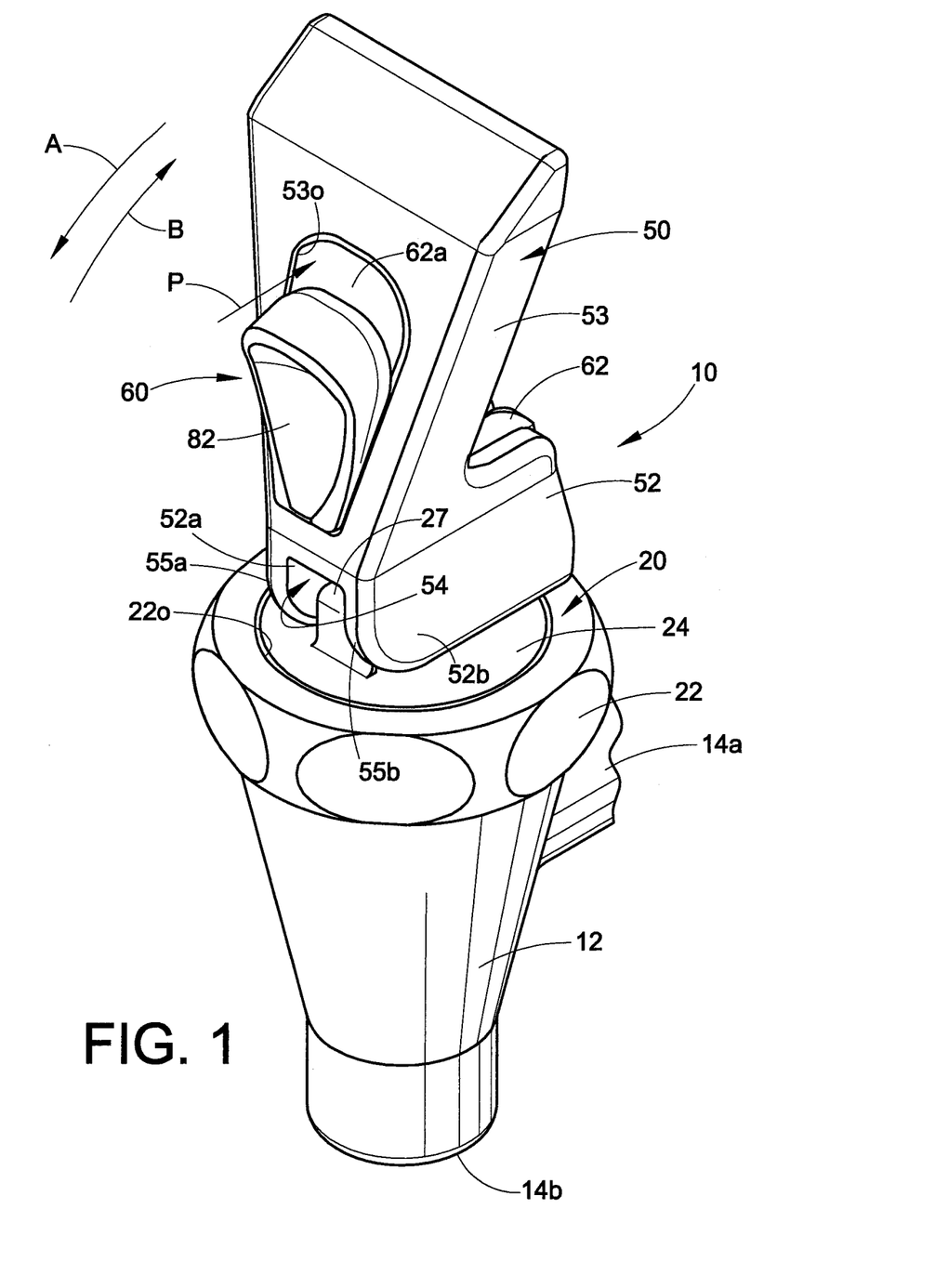
FIG. 1 is an isometric view of a faucet with locking safety handle formed in accordance with the present development (with a portion of the faucet body broken away)
Figures 2, 2A:
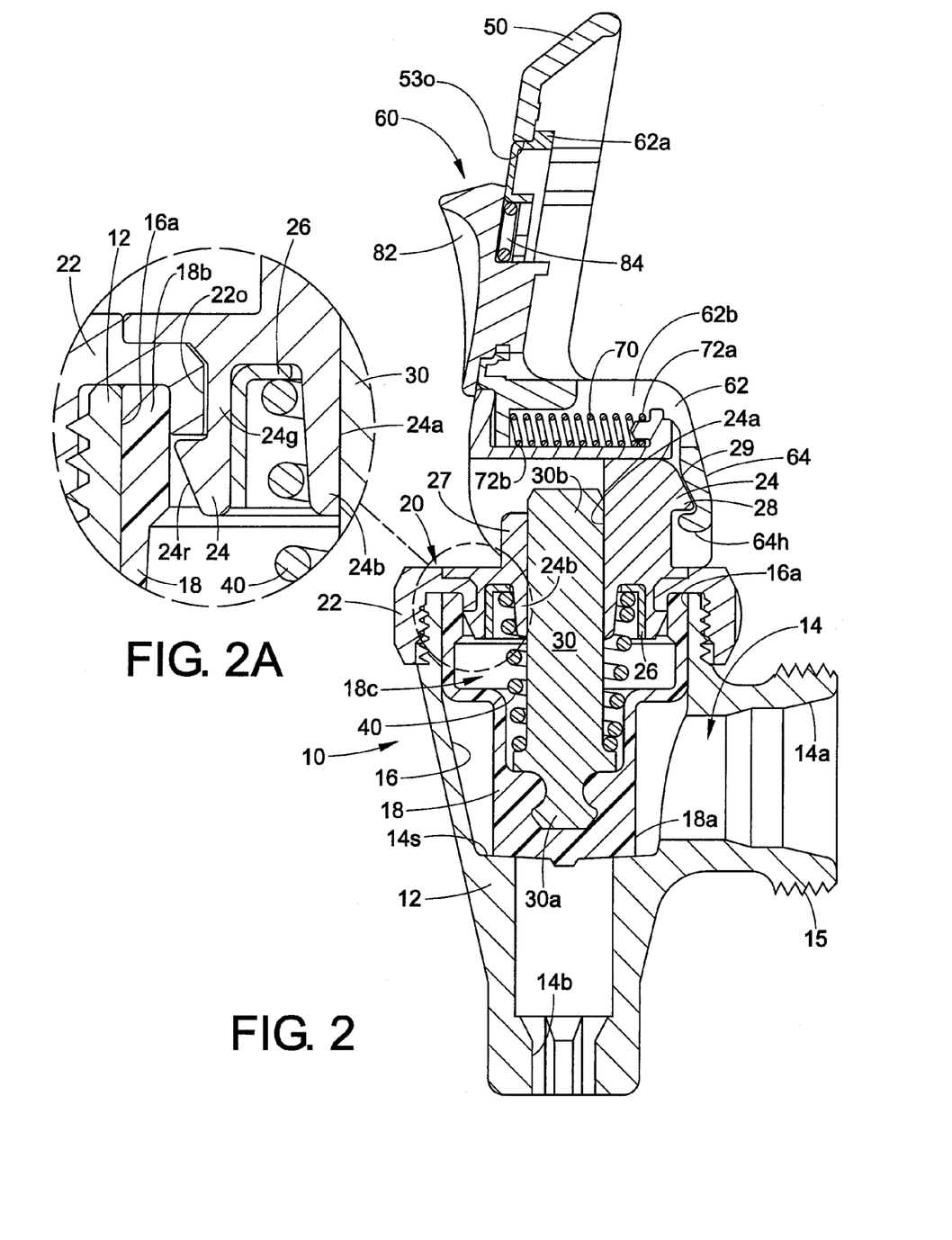
FIG. 2 is a section view of the faucet shown in FIG. 1.
FIG. 2A is an enlarged detail view of a portion of FIG. 2.

Referring to FIGS. 1 and 2, a faucet 10 formed in accordance with the present development includes a body 12 defining or comprising a liquid flow passage 14 (FIG. 2) that extends through the body 12 from an inlet 14a to an outlet 14b. Adjacent the inlet 14a, the body 14 comprises threads 15 or other means such as a nut so that the body 12 is adapted to be secured to an associated urn or other container in which a liquid or other flowable material to be dispensed is contained, e.g., a coffee urn or an iced tea container.

The body 12 also includes or defines a valve chamber 16 that intersects the passage 14 between the inlet 14a and outlet 14b. The valve chamber 16 includes an upper opening 16a that opens through the body 12. The valve chamber also includes a valve seat 14s that is defined by the body 12 between the inlet 14a and outlet 14b of the passage 14, and access to the valve chamber 16 and valve seat 14s is provided via upper access opening 16a of valve chamber 16.

A resilient polymeric seat cup 18 or other valve element is located in the valve chamber 16 to selectively allow and selectively block liquid flow from the inlet 14a to the outlet 14b through the valve chamber 16 by selective engagement of the seat cup 18 with the valve seat 14s. The seat cup 18 includes a closed inner end 18a that is adapted to engage the valve seat 14s with a fluid-tight seal to block flow of liquid from the inlet 14a of passage 14 to outlet 14b. An open upper end 18b (FIG. 2A) of the seat cup is closely received in the upper opening 16a of the valve chamber 16 and engages the upper opening 16a with a fluid-tight seal. Between the closed inner end 18a and open upper end 18b, the seat cup defines an open recess 18c. The part of the closed end 18a of the seat cup 18 that mates with the valve seat 14s is shown as flat, but it can alternatively be curved or rounded or otherwise shaped as desired.

A bonnet or bonnet assembly 20 is secured to the body 12 in covering relation with upper opening 16a of valve chamber 16 to close the valve chamber 16 and secure/capture the seat cup 18 therein. As shown, the bonnet 20 is an assembly that includes: (i) a bonnet ring 22 that is threaded or otherwise secured to the body 12 adjacent the upper opening 16a of the valve chamber 16; and, (ii) a bonnet insert 24 that is fixedly secured in a central opening 22o of the bonnet ring 22. The bonnet ring 22 can be metal or a molded polymeric material. The bonnet insert 24 is preferably a molded one-piece polymeric structure that includes a plurality of resilient legs 24g (FIG. 2A), each of which includes a ramped lock face 24r. The bonnet insert 24 is connected to the bonnet ring 22 with a snap-fit by insertion of the resilient legs 24g through the bonnet ring opening 22o such that the lock faces 24r engage the bonnet ring 22 with a snap-fit. In the illustrated embodiment, the bonnet assembly 20 further includes a spacer 26 such as a cup washer or the like having an inverted L-shaped cross-section that is installed radially inward from or behind the resilient legs 24g after snap-fit connection of the bonnet insert 24 to the bonnet ring 22 to prevent radial inward deflection of the resilient legs 24g required for separation of the bonnet insert 24 from the bonnet ring 22. The bonnet ring 22 and bonnet insert 24 can be connected by other suitable means and it is not intended that the present development be limited to the illustrated snap-fit arrangement. The insert 24 can be threaded to the ring 22, fasteners can be used to secure the insert 24 to the ring 22, or the ring and insert 22,24 can be defined as a one-piece construction such as a one-piece molded polymeric or metallic construction.

The closed inner end 18a of the seat cup 18 is selectively movable away from or unseated relative to the valve seat 14s to allow selective flow of liquid through the passage 14 from inlet 14a to outlet 14b. In particular, a valve stem 30 extends into the open recess 18c of the seat cup and includes a first/inner end 30a secured to the closed inner end 18a of the seat cup, e.g., by mechanical interlock as shown in FIG. 2 or other means. A second/outer end 30b of the stem 30 projects outwardly from the open upper end 18b of the seat cup and through an aperture 24a defined in the bonnet insert 24 so as to be located external to the valve chamber 16 and external to body 12. A valve spring 40 or other biasing element/means is provided to bias the valve element 18 to its closed position. As shown, the valve spring 40 biases the closed inner end 18a of the seat cup 18 into sealing engagement with the valve seat 14s. In the illustrated embodiment, the valve spring 40 is a coil spring that coaxially surrounds the stem 30 and includes an inner end engaged with the inner end 30a of the stem and outer end engaged with the spacer 26 of the bonnet assembly 20 so as to bias the inner end 30a of the stem away from the bonnet assembly 20 which, in turn, biases the closed inner end 18a of the seat cup into sealing engagement with the valve seat 14s. As shown, the bonnet insert 24 includes a boss 24b that surrounds its aperture 24a, and the outer end of spring 40 is received over the boss 24b.

Figure 3:
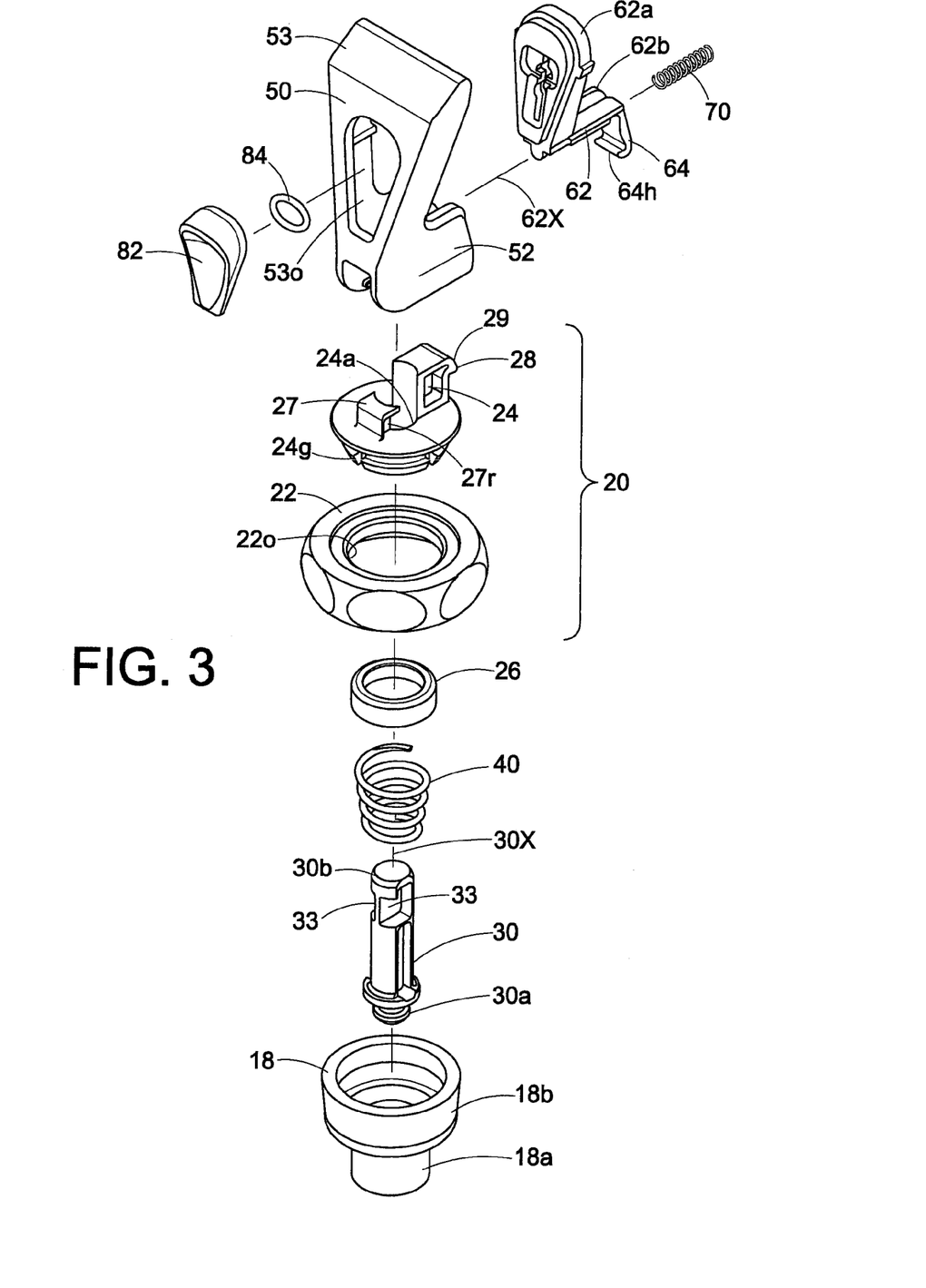
FIG. 3 is an exploded isometric view of an upper portion of the faucet of FIG. 1, including the locking safety handle.
Figure 4A:
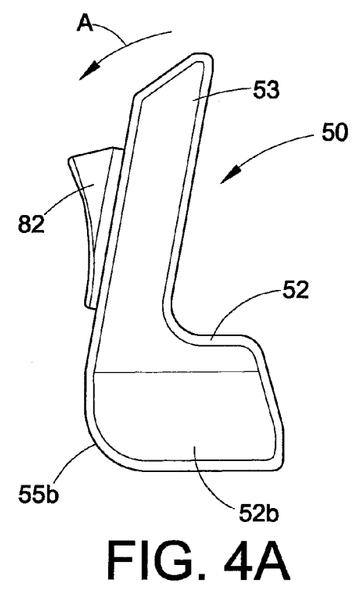
FIG. 4A is a side view of the locking safety handle, with the safety latch in its engaged position.
Figure 4B:
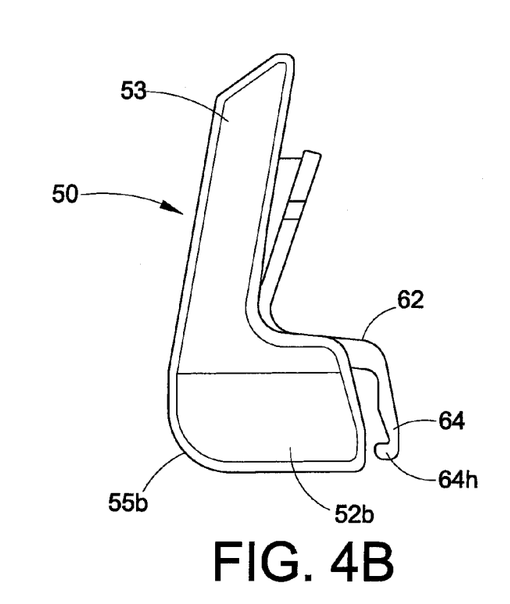
FIG. 4B is a side view of the locking safety handle, with the safety latch in its disengaged position.
Figures 4C, 4D:
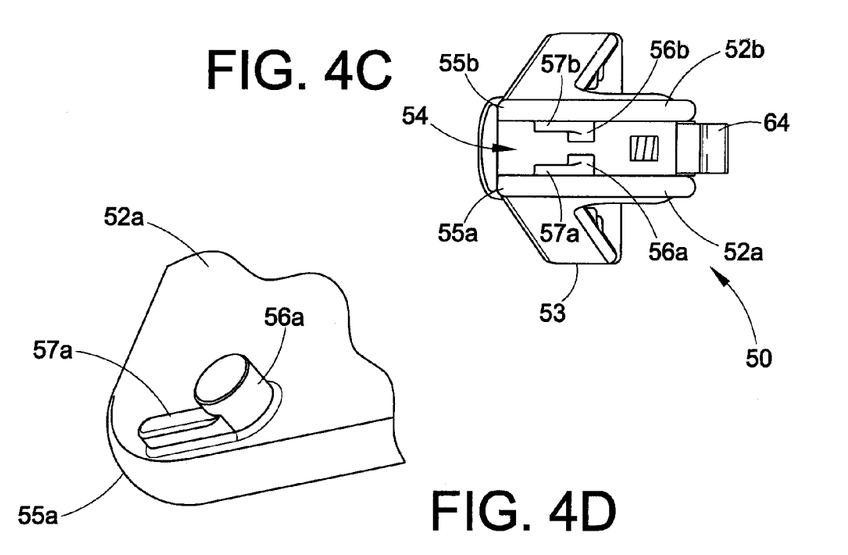
FIG. 4C is a bottom view of the locking safety handle, with the safety latch in its disengaged position.
FIG. 4D is an enlarged partial isometric view of a portion of the locking safety handle.

A handle 50 is operatively secured to the second/outer end 30b of the valve stem with a pivoting connection. The handle 50 is shown separately in FIGS. 4A, 4B, 4C. The handle 50 includes a base 52 that is pivotally connected to the stem 30 and an upper portion 53 by which the handle 50 is manually pivoted by a user when the user desires to dispense liquid from the faucet 10. The handle base 52 comprises parallel spaced-apart first and second cam walls 52a,52b that define a channel 54 therebetween. A bottom view of the handle is shown in FIG. 4C, where it can be seen that first and second pivot lugs 56a,56b project inwardly toward each other into the channel 54. These pivot lugs 56a,56b are adapted to be slidably received into respective pivot slots 33 (see FIG. 3) defined in the second/outer end 30b of the stem to pivotally connect the handle 50 to the stem 30. The pivoting connection between the handle 50 and stem 30 can be accomplished in other ways, e.g., by a pin or the like.

Pivoting movement of the handle 50 on an arc in direction A (FIG. 1) from its first position (shown) to a second position (not shown) causes cam surfaces 55a,55b of the respective cam walls 52a,52b to bear against the bonnet 20 such that handle 50 pulls the stem 30 outward through the bonnet insert aperture 24a so that the inner end 30a of the stem pulls the closed inner end 18a of the seat cup 18 away from the valve seat 14s against the biasing force of spring 40 to allow flow of liquid from the passage inlet 14a to the passage outlet 14b for dispensing the liquid into a cup or other container located beneath the outlet 14b. The seat cup 18 resiliently deforms to accommodate movement of its closed inner end 18a away from valve seat 14s. Release of the handle 50 allows valve spring 40 to resiliently return stem 30, seat cup 18 and handle 50 to their positions shown in FIGS. 1 and 2, where the closed inner end 18a of seat cup 18 is engaged with the valve seat 14s to block flow of liquid. Movement of the handle 50 from the first position to the second position results in linear movement of the valve stem along its longitudinal axis 30X (FIG. 3) to control the position of the seat cup 18 or other valve element.

The faucet handle 50 includes a safety lock 60 that selectively prevents movement of the handle 50 in direction A from its first (faucet closed) position to its second (faucet opened) position. The safety lock 60 is normally locked and must be manually unlocked by a user before the handle 50 can be pivoted on the arc A to dispense liquid from the passage outlet 14b. With particular reference to FIGS. 2 and 3, it can be seen that the bonnet insert 24 includes a catch 28. The catch 28 can alternatively be located on any other part of the bonnet 20. The safety lock 60 includes a movable latch such as a slide latch 62 connected to the handle 50 and movable between an engaged or latched position (shown in FIG. 2) and a disengaged or unlatched position (shown in FIGS. 4B and 4C). The slide latch 62 includes a latch arm 64 that engages the catch 28 when the slide latch 60 is in its latched position (FIG. 2) and that is disengaged from the catch 28 when the slide latch 60 is in its unlatched position (FIG. 4C). Latch arm 64 includes a hooked outer/distal end 64h. Engagement between the latch arm hook 64h and catch 28 prevents manual pivoting movement of the handle 50 in the direction A from its first position to its second position to dispense liquid from the outlet 14b of body 12 as described above.

Figure 6:
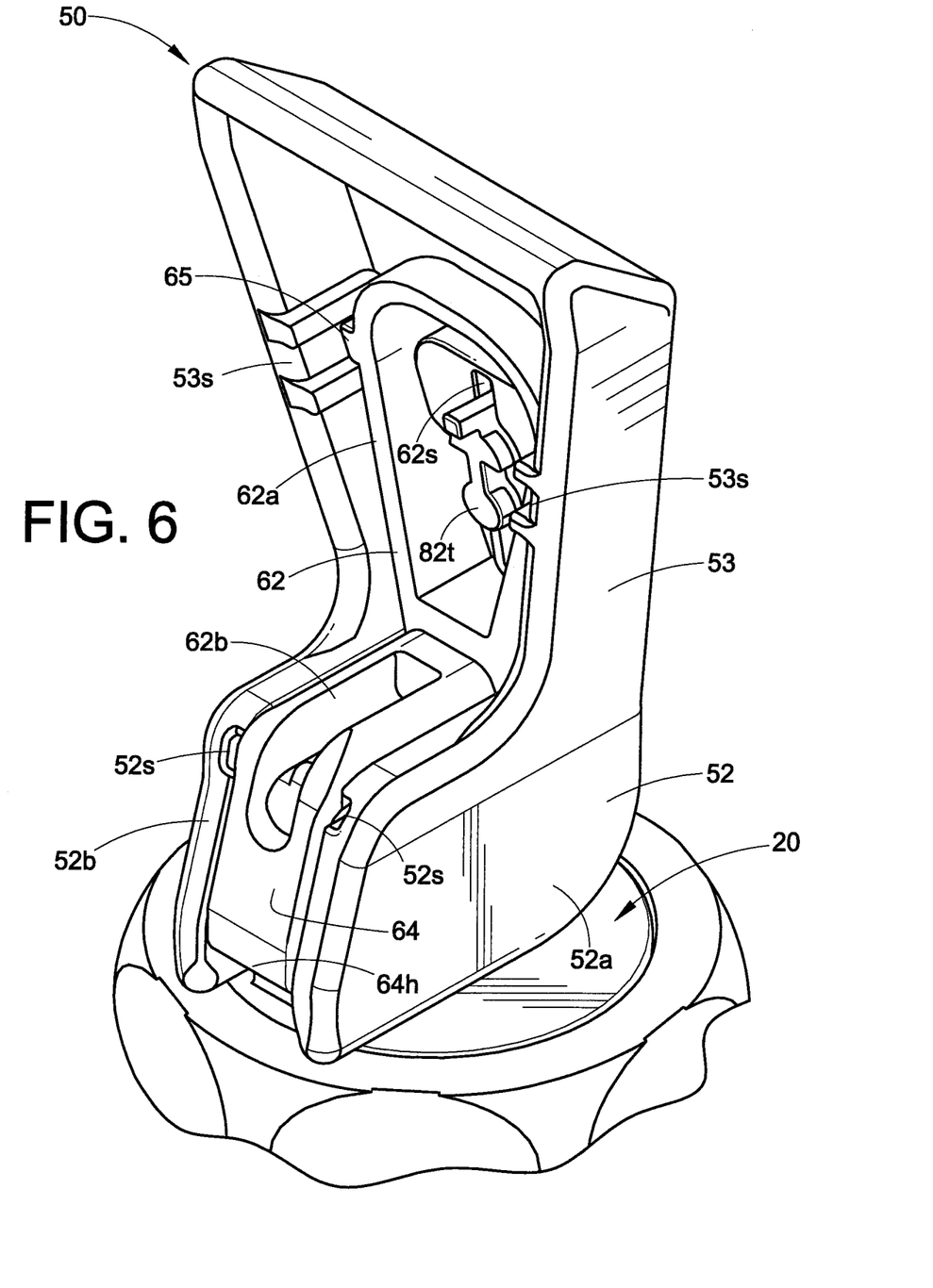
FIG. 6 is a rear isometric view of the locking safety handle.
Figure 7:
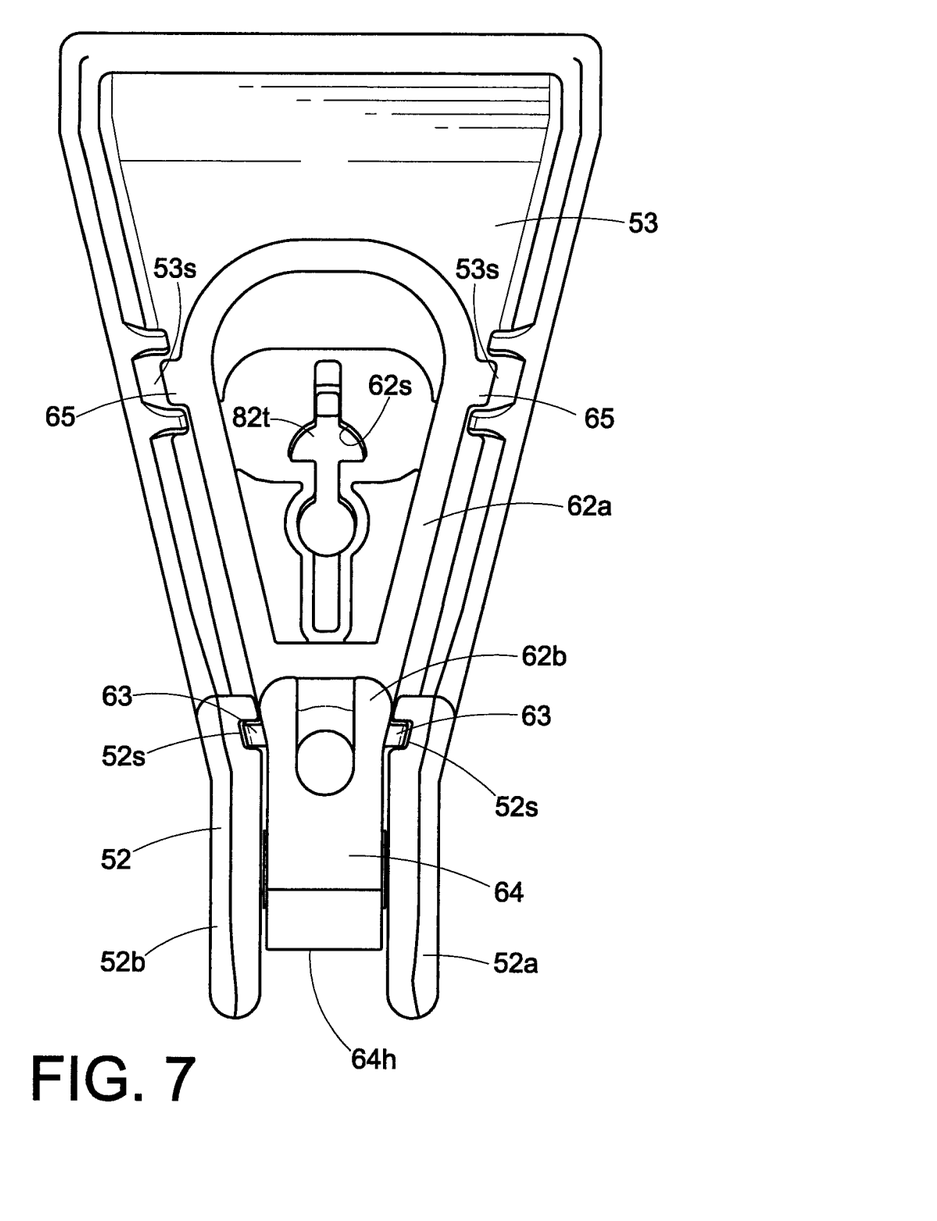
FIG. 7 is a rear view of the locking safety handle.

The slide latch 62 is adapted for selective manual sliding movement from its engaged or latched position to its disengaged or unlatched position. The slide latch 62 includes an upper portion 62a and a lower portion 62b. As can be seen in FIGS. 6 and 7, the lower portion 62b of the slide latch 62 is located between and slidably engaged with the first and second cam walls 52a,52b. The first and second cam walls 52a, 52b comprise respective first and second lower latch slots 52s that slidably receive first and second lower tabs 63 (FIG. 7) of the slide latch 62. The upper portion 62a of the slide latch 62 is preferably slidably engaged with the upper portion 53 of the handle 50. In the illustrated embodiment, the handle upper portion 53 comprises first and second upper latch slots 53s that slidably receive first and second upper tabs 65 of the slide latch 62.

The upper portion 53 of handle 50 includes an opening 53o, and the upper portion 62a of the slide latch 62 is located adjacent the opening 53o, e.g., by being located in the opening 53o. A user can manually push the upper portion 62a of the slide latch inward relative to upper portion 53 of handle 50 (as indicated by arrow P in FIG. 1) to move slide latch 62 from its latched position (FIG. 2) to its unlatched position (FIGS. 4B and 4C) in which the latch arm 64 is disengaged from catch 28 to allow pivoting movement of the handle 50 in direction A from its first position to its second position. The slide latch 62 moves linearly between its latched position and unlatched position along an axis 62X (FIG. 3) that lies transverse to the longitudinal axis 30X of the stem 30. As shown, the slide latch axis 62X is arranged substantially perpendicular to the stem axis 30X. This transverse arrangement of the axes 62X, 30X has been deemed to provide a preferred action for a user in terms of comfort and ease of use when operating the slide latch 62 and can reduce the chance for incidental movement of the faucet handle 50 toward its second (faucet opened) position during movement of the slide latch from its latched position to its unlatched position as compared to latches requiring latch movement coincident with or parallel to the stem axis 30X.

The slide latch 62 is biased toward its latched position. In the illustrated embodiment, the slide latch is biased to its latched position by a latch spring 70 such as a coil spring that includes a first end 72a engaged with the base 52 of handle 50, and a second end 72b engaged with the slide latch 62.

Catch 28 includes a ramped surface 29 that diverges radially outward as it extends toward bonnet 20. When the handle 50 pivots in a direction B from its second (faucet opened) position to its first (faucet closed) position to re-seat the inner end 18a of seat cup 18 on valve seat 14s, the latch arm hook 64h of slide latch 62 will contact the diverging ramped surface 29 of the catch 28 and the latch arm 64 will resiliently deflect so that the handle 50 can return fully to its first position, where the latch hook 64h engages the catch 28 as shown in FIG. 2.

Figure 5:
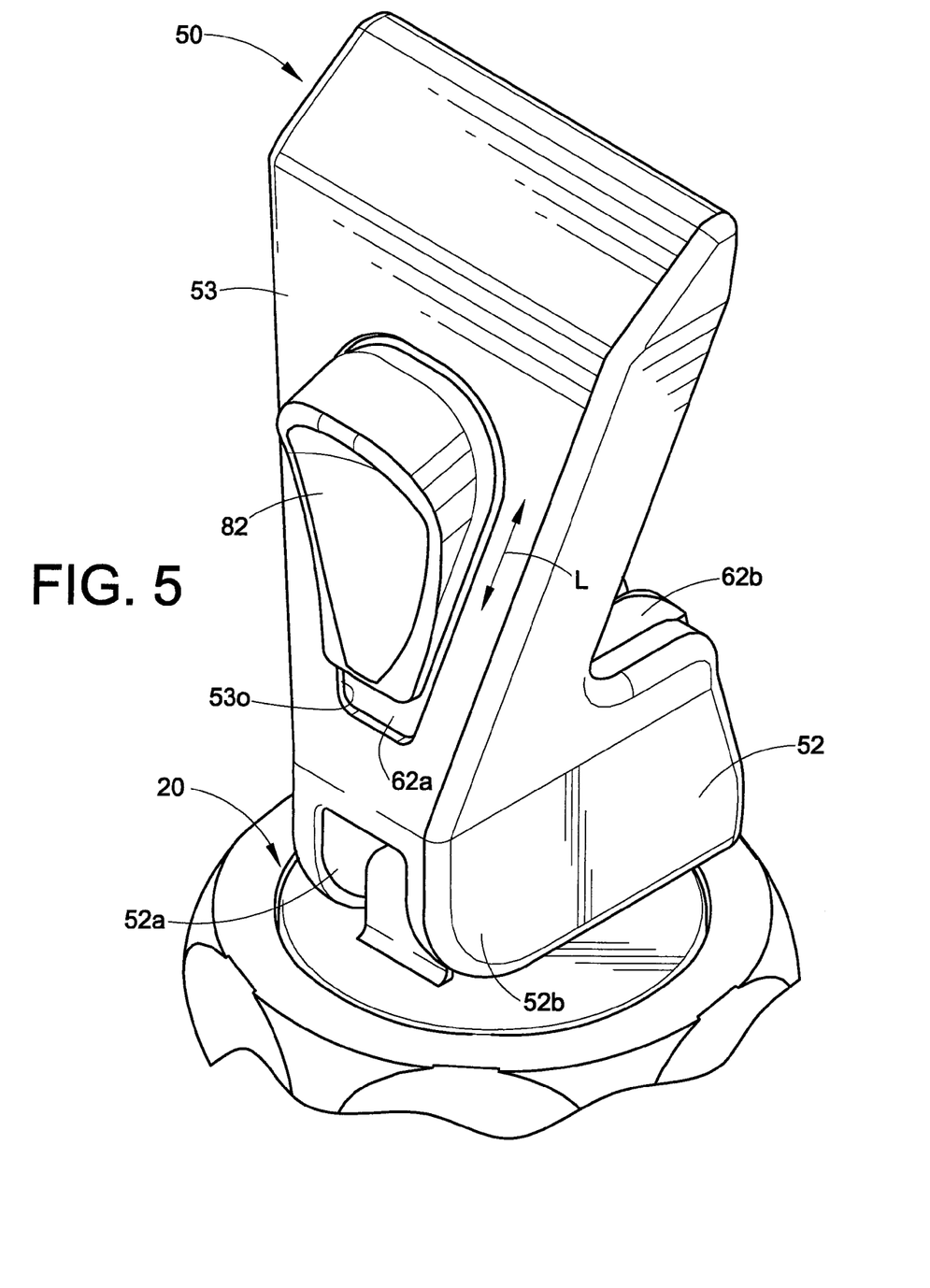
FIG. 5 is a front isometric view of the locking safety handle, with its primary lock element in its unlocked position (but with the latch still engaged)

The safety lock 60 preferably further includes a primary slide lock that prevents manual movement of the slide latch 62 from its latched position to its unlatched position when the primary slide lock is locked/engaged. In particular, the primary slide lock includes a primary lock element 82 that is slidably connected to the upper portion 62a of the slide latch 62. As shown in FIGS. 6 and 7, the upper portion 62a of the slide latch 62 includes a key shaped slot 62s and the primary lock element 82 includes a matching key tab 82t that projects therefrom and that mates with the key shaped slot 62s, so that the primary lock element 82 is captured to the slide latch upper portion 62a and is slidable relative to the slide latch upper portion 62a as indicated by arrow L in FIG. 5. The primary lock element 82 is biased by a primary lock spring 84 (shown as a resilient polymeric o-ring) to its locked/engaged (down) position as shown in FIGS. 1 and 2 where the primary lock element 82 is not in alignment with (unregistered with) the handle opening 53o so that the primary lock element 82 overlaps at least one edge of the handle opening 53o, which prevents movement of the slide latch upper portion 62a inwardly away from opening 53o in direction P as described above due to interference between the handle upper portion 53 and the primary lock element 82. The primary lock element 82 is selectively manually movably to its unlocked/disengaged (up) position (FIG. 5) where it is located in alignment with or registered with the handle opening 53o so that the slide latch upper portion 62a can be manually moved in direction P relative to the handle 50 from its latched position to its unlatched position by application of manual force on primary lock element 82 which force is transferred to the slide latch upper portion 62a. The o-ring 84 or other spring resiliently returns the primary lock element 82 to its engaged position when the primary lock element 82 is released and when the slide latch 62 is released and returns to its latched position. As noted, the latch arm 64 deflects on ramped surface 29 when the handle 50 pivots from its second (faucet opened/liquid dispensing) position back to its first (faucet closed) position, and this deflection of the latch arm 64 is required due to the fact that primary lock element 82 will prevent sliding movement of the slide latch 62 toward its disengaged position after the slide latch 62 is allowed to move back to its latched position.

The safety lock 60, including the primary lock element 82 and the slide latch 62, ensures that three discrete steps are required to dispense liquid from the faucet 10. The primary lock element 82 must be moved from its locked position to its unlocked position, the slide latch must be moved from its latched position to its unlatched position, and the handle must be moved from its first position to its second position. This provides added safety as compared to a faucet that requires only a single operation to overcome the safety feature, i.e., a faucet that requires only two steps to open.

When the handle 50 is located in its first (faucet closed) position, the handle 50 is prevented from being pivoted in direction B (opposite direction A) in a direction moving away from its first (faucet closed) position. In the illustrated embodiment, as shown in FIGS. 4C and 4D, the cam walls 52a,52b include respective stop tabs 57a,57b that project into the channel 54, generally between the cam surfaces 55a,55b and the pivot lugs 56a,56b. The bonnet insert 24 includes a stop block 27 (see also FIG. 3) that includes stop recesses 27r in its opposite faces, and the stops tabs 57a,57b are received in respective stop recesses 27r when the handle 50 is located in its first position. Engagement between the stop tabs 57a, 57b and the stop block 27 prevents pivoting movement of the handle 50 in a direction B opposite direction A, when the handle 50 is located in its first position. The stop tabs 57a,57b and stop block 27 do not affect pivoting movement of the handle in direction A, and the stop tabs 57a,57b and stop block 27 do not affect pivoting movement of the handle in the direction B when the handle 50 is moving from its second (faucet opened) position toward its first (faucet closed) position.

The present development has been described with reference to preferred embodiments. It is intended that the following claims be construed as encompassing all modifications and alterations that will be apparent to those of ordinary skill in the art after reading this specification to the fullest extent permitted by law while preserving the validity of the claims.

The invention claimed is:

1. A liquid dispensing faucet comprising:
a body comprising an inlet, an outlet, a liquid flow passage that extends from said inlet to said outlet, a valve chamber in communication with said liquid flow passage between said inlet and said outlet, a valve seat located in said valve chamber, and an access opening that provides access to said valve chamber from outside said body;
a bonnet secured to said body in covering relation with said access opening, said bonnet comprising a catch;
a valve element located in said valve chamber, said valve element adapted to be selectively engaged with and disengaged from said valve seat for controlling flow of liquid from said inlet to said outlet through said valve chamber;
a valve stem that extends through said bonnet, said valve stem comprising an inner end secured to said valve element and an outer end located external to said body;
a handle comprising a base and an upper portion connected to said base, said base of said handle pivotally secured to said outer end of said valve stem and said handle pivotable in a first direction from a first position to a second position, wherein said valve element is engaged with said valve seat and blocks liquid flow from said inlet to said outlet when said handle is located in its first position and said valve element is disengaged from said valve seat and allows liquid flow from said inlet to said outlet when said handle is located in its second position;
said handle further comprising a safety lock that selectively prevents movement of said handle from its first position to its second position, said safety lock comprising:
a latch that moves between a latched position and an unlatched position, said latch adapted to engage said catch of said bonnet and prevent movement of said handle from its first position to its second position when said latch is in its latched position, and said latch disengaged from said catch of said bonnet when said latch is in its unlatched position,
a latch spring that biases said latch toward its latched position;
said latch manually movable from its latched position to its unlatched position;
wherein said catch comprises a ramped surface that diverges outwardly as it extends toward said bonnet;
said latch comprises a hook at its outer end and said hook engages said catch when said latch is in its latched position and said handle is in its first position; and,
said hook slidably engages said ramped surface and said outer end of said latch resiliently deflects when said handle moves from said second position to said first position when said latch is in its latched position.

2. A liquid dispensing faucet comprising:
a body comprising an inlet, an outlet, a liquid flow passage that extends from said inlet to said outlet, a valve chamber in communication with said liquid flow passage between said inlet and said outlet, a valve seat located in said valve chamber, and an access opening that provides access to said valve chamber from outside said body;
a bonnet secured to said body in covering relation with said access opening, said bonnet comprising a catch;
a valve element located in said valve chamber, said valve element adapted to be selectively engaged with and disengaged from said valve seat for controlling flow of liquid from said inlet to said outlet through said valve chamber;
a valve stem that extends through said bonnet, said valve stem comprising an inner end secured to said valve element and an outer end located external to said body;
a handle comprising a base and an upper portion connected to said base, said base of said handle pivotally secured to said outer end of said valve stem and said handle pivotable in a first direction from a first position to a second position, wherein said valve element is engaged with said valve seat and blocks liquid flow from said inlet to said outlet when said handle is located in its first position and said valve element is disengaged from said valve seat and allows liquid flow from said inlet to said outlet when said handle is located in its second position;
said handle further comprising a safety lock that selectively prevents movement of said handle from its first position to its second position, said safety lock comprising:
a latch that moves between a latched position and an unlatched position, said latch adapted to engage said catch of said bonnet and prevent movement of said handle from its first position to its second position when said latch is in its latched position, and said latch disengaged from said catch of said bonnet when said latch is in its unlatched position,
a latch spring that biases said latch toward its latched position;
said latch manually movable from its latched position to its unlatched position, wherein said upper portion of said handle comprises an opening and said latch comprises an upper portion that lies adjacent said opening, said latch movable between its latched and unlatched positions by manual force exerted on said upper portion of said latch through said opening.

3. The faucet as set forth in claim 2, wherein said latch is slidably connected to said handle and slides between its latched and unlatched positions.

4. The faucet as set forth in claim 3, wherein said latch slides between its latched and unlatched positions on an axis that lies transverse to a longitudinal axis of the valve stem.

5. The faucet as set forth in claim 2, wherein said latch comprises a hook at its outer end and said hook engages said catch when said latch is in its latched position and said handle is in its first position.

6. The faucet as set forth in claim 2, wherein said safety lock further comprises a primary lock element movably connected to said upper portion of said latch and movable between a locked position and an unlocked position, said primary lock element registered with said opening when in said unlocked position to permit movement of said latch to its unlatched position, and said primary lock element overlapping an edge of said opening when in said locked position to prevent movement of said latch to its unlatched position.

7. The faucet as set forth in claim 6, wherein said primary lock element is slidably connected to said upper portion of said latch and slides between its locked and unlocked positions.

8. The faucet as set forth in claim 7, wherein said safety lock further comprises a primary lock spring that biases said primary lock toward its locked position.

9. The faucet as set forth in claim 2, wherein said bonnet comprises:
a ring secured to said body; and,
an insert connected to said ring, wherein said valve stem extends through said insert and wherein said catch is provided as part of said insert.

10. The faucet as set forth in claim 9, wherein said insert comprises a one-piece construction that defines said catch.

11. The faucet as set forth in claim 2, wherein said base of said handle comprises first and second parallel spaced-apart cam walls that comprise respective first and second cam surfaces that bear against said bonnet, wherein said first and second cam surfaces are shaped such that movement of said handle from its first position to its second position causes said handle to pull said valve stem outwardly relative to said valve chamber to disengage said valve element from said valve seat.

12. The faucet as set forth in claim 11, wherein part of said latch is located between and slidably connected to said first and second cam walls.

13. The faucet as set forth in claim 11, wherein said first and second cam walls comprise respective first and second stop tabs that engage a portion of said bonnet and prevent movement of said handle away from said first position in a direction opposite said first direction.

14. The faucet as set forth in claim 2, wherein said valve element comprises a resilient elastomeric seat cup.

15. A faucet comprising:
a body including an inlet and an outlet;
a valve element located in said body that controls flow of liquid from said inlet to said outlet;
a bonnet connected to said body and capturing said valve element in said body;
a catch connected to said body;
a valve stem including an inner end connected to said valve element and an outer end located external to said body;
a handle connected to said outer end of said valve stem and movable in a first direction from a first position, where said handle and valve stem locate said valve element to block said flow of liquid from said inlet to said outlet, to a second position, where said handle and valve stem locate said valve element to allow said flow of liquid from said inlet to said outlet;
a safety lock provided as part of said handle, said safety lock comprising a latch that is manually movable between an engaged position and a disengaged position, wherein said safety lock prevents movement of said handle from said first position to said second position when said latch is in its engaged position and engaged with said catch;
wherein said safety lock further comprises a primary lock element that moves between a locked position and an unlocked position, wherein said primary lock element prevents movement of said latch from its engaged position to its disengaged position when said primary lock element is in its locked position, and wherein said primary lock element allows movement of said latch from its engaged position to its disengaged position when said primary lock element is in its unlocked position, such that dispensing liquid from said faucet requires at least three operations comprising: (i) movement of said primary lock element from its locked position to its unlocked position; (ii) movement of said latch from its engaged position to its disengaged position; and, (iii) movement of said handle from its first position to its second position.

16. The faucet as set forth in claim 15, wherein:
movement of said handle from its first position to its second position causes linear movement of said valve stem along a longitudinal axis of said valve stem;
said latch is manually movable to its disengaged position by sliding movement of said latch along an axis that is transverse to said longitudinal axis of said valve stem.

17. A faucet handle comprising:
a base adapted to be connected to an associated valve stem, and an upper portion connected to said base;
a safety lock comprising:
a latch that is slidably connected to said base and manually movable between an engaged position and a disengaged position;
a latch spring that biases said latch toward its engaged position;
a primary lock element connected to said latch and movable between a locked position and an unlocked position, said primary lock element preventing movement of said latch from its engaged position to its disengaged position when said primary lock element is in its locked position, and said primary lock element allowing movement of said latch from its engaged position to its disengaged position when said primary lock element is in its unlocked position;
a primary lock spring that biases said primary lock element toward its locked position.

18. A faucet comprising:
a body including a catch connected to said body;
a valve element located in said body that controls flow of liquid;
a valve stem including an inner end operably connected to said valve element and an outer end located external to said body;
a handle operably connected to said outer end of said valve stem and movable in a first direction from a first position, where said handle and valve stem locate said valve element to block said flow of liquid, to a second position, where said handle and valve stem locate said valve element to allow said flow of liquid;
a safety lock connected to said handle, said safety lock comprising a latch that is selectively engaged with said catch to prevent movement of said handle from said first position to said second position, said latch manually movable from an engaged position wherein said latch is engaged with said catch to a disengaged position where said latch is disengaged from said catch;
said safety lock further comprising a primary lock that is selectively movable from a locked position where said primary lock prevents movement of said latch from said engaged position to said disengaged position, to an unlocked position where said primary lock allows movement of said latch from said engaged position to said disengaged position.

* * * * *